United States Patent [19]

Anderson

[11] 4,040,490
[45] Aug. 9, 1977

[54] ROCK WINDROWER

[76] Inventor: Raymond R. Anderson, Ray, N. Dak. 58849

[21] Appl. No.: 665,100

[22] Filed: Mar. 8, 1976

[51] Int. Cl.² .............................................. A01B 43/00
[52] U.S. Cl. ........................................ 171/63; 56/376
[58] Field of Search .................... 171/63; 56/365, 366, 56/377, 376

[56] References Cited

U.S. PATENT DOCUMENTS

| | | | |
|---|---|---|---|
| 2,447,354 | 8/1948 | Morrill | 56/377 |
| 2,738,640 | 3/1956 | Schroeppel | 56/377 |
| 2,847,814 | 8/1958 | Wearer | 56/377 X |
| 2,938,586 | 5/1960 | Gaffney | 171/63 |

*Primary Examiner*—Russell R. Kinsey

*Attorney, Agent, or Firm*—Clarence A. O'Brien; Harvey B. Jacobson

[57] ABSTRACT

An elongated frame is provided including front and rear ends. The rear end portion of the frame includes rear wheeled transverse axle structure supported from the frame for adjustable angular displacement in a horizontal plane relative to the frame. The front end portion of the frame includes towing structure supported from the frame for adjustable shifting transversely thereof and operative, in conjunction with the adjustable axle structure, to establish an angularly adjusted towed relationship of said elongated frame behind a towing vehicle to which the towing structure is attached. The frame further includes longitudinally extending and traversely facing rake structure.

9 Claims, 9 Drawing Figures

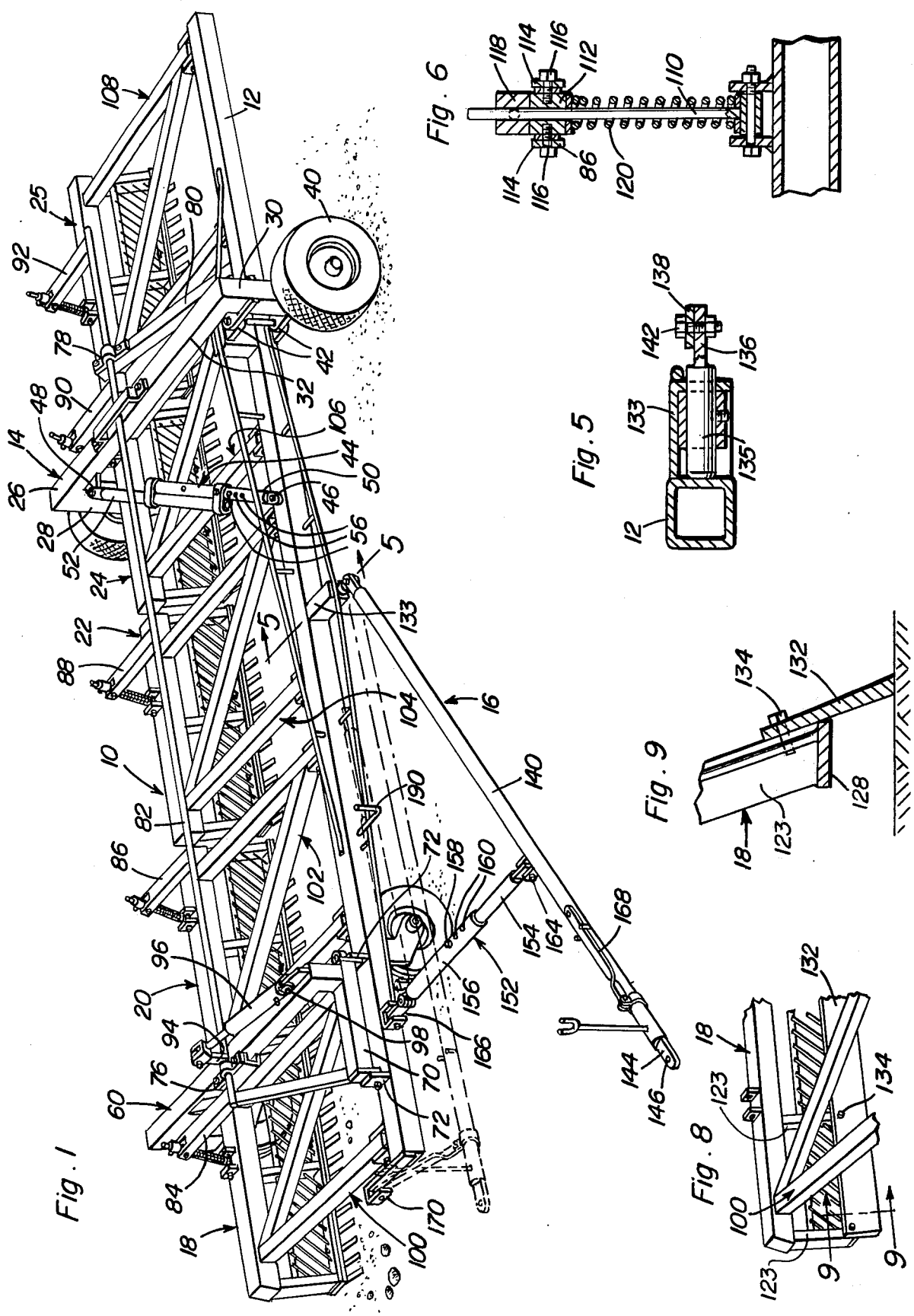

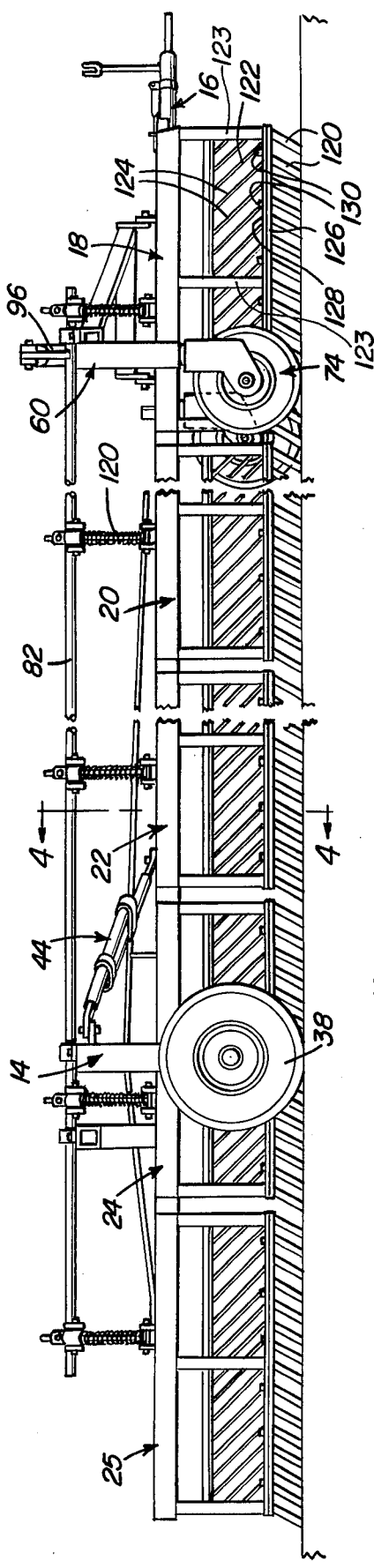
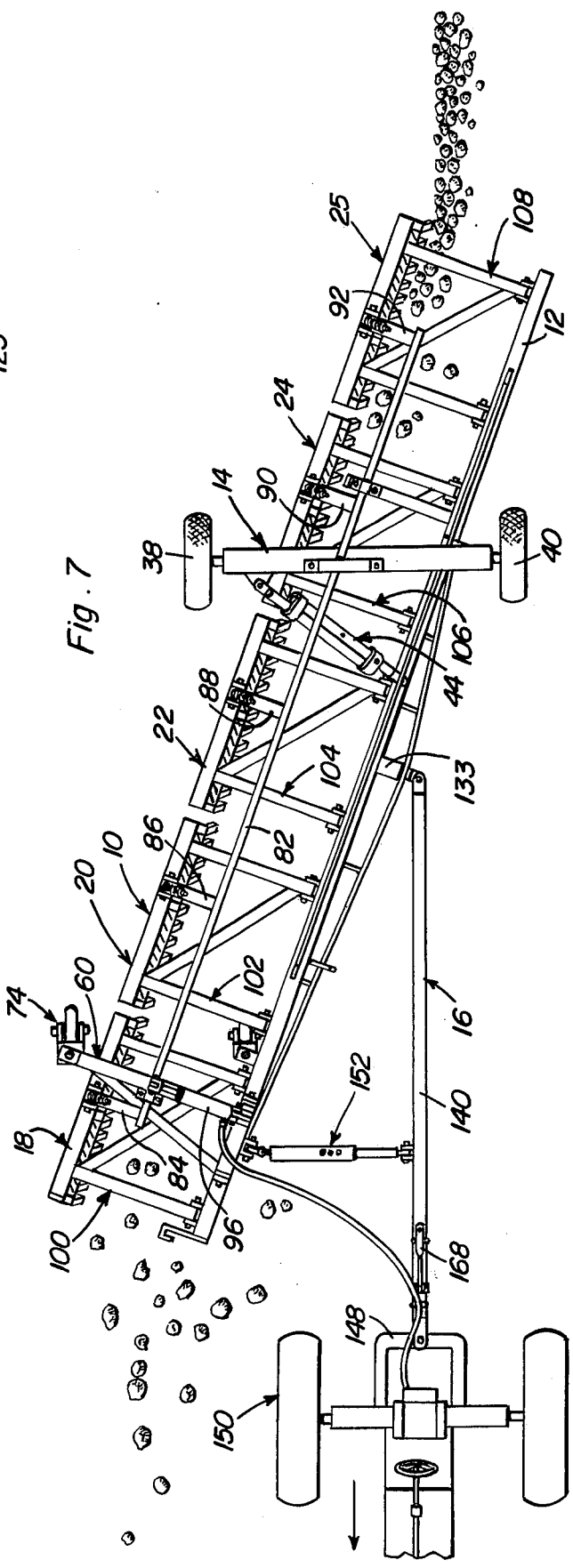

ROCK WINDROWER

BACKGROUND OF THE INVENTION

Various forms of structures have been heretofore designed for raking and windrowing ground level rocks and stones. However, these previously known stone and rock raking and windrowing structures have not been constructed in a manner whereby they may act upon a wide path extending in the direction of the travel of the machine, be of simple construction and yet readily trailerable in a manner so as to be able to pass through narrow fence openings.

Examples of rock picking and windrowing devices as well as other structures including some of the basic structural features of the instant inention are disclosed in U.S. Pat. Nos. 1,325,580, 1,417,309, 2,479,719, 2,618,111, 2,775,090, 3,173,497 and 3,800,884.

BRIEF DESCRIPTION OF THE INVENTION

The rock windrower of the instant invention is constructed in a manner whereby an elongated rake structure may be variably angularly advanced over the ground so as to provide not only a variable raking action on the ground traversed by the windrower but also a variable effective width of the rock windrower. In addition, the elongated rake structure includes a plurality of longitudinally extending, elongated and end aligned rake sections supported for individual floating movement relative to a main frame with the rake sections facing transversely of the frame and structure is provided whereby a variable amount of downward pressure may be applied to the ground by each rake section. Furthermore, the rock windrower is constructed in a manner whereby it may be towed in a non-operative condition with the windrower having a narrow width for ease in passage through narrow fence openings.

The main object of this invention is to provide a rock windrower capable of being variously adjusted to provide various rock raking and windrowing action on the ground over which the windrower is moved.

Another object of this invention is to provide a rock windrower capable of being transported from one location to another in the manner of a trailer and with the rock windrower having a narrow width when in the transport condition thereof.

Another important object of this invention is to provide a rock windrower with a plurality of individual rake sections each supported from a main frame for floating movement relative to the main frame independent of floating movement of the other rake sections relative to the main frame.

A still further important object of this invention is to provide a rock windrower which may also be utilized for landscaping purposes.

A final object of this invention to be specifically enumerated herein is to provide a rock windrower in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the rock windrower;

FIG. 2 is a fragmentary side elevational view of the rock windrower as seen from the rear side of the windrower of FIG. 1;

FIG 5. is an enlarged fragmentary transverse vertical sectional view taken substantially upon the plane indicated by the section line 5—5 of FIG. 1;

FIG. 6 is an enlarged fragmentary longitudinal vertical sectional view taken substantially upon the plane indicated by the section line 6—6 of FIG. 4;

FIG. 7 is a top plan view of the windrower in operative position for windrowing rocks and with the windrower coupled to a tractor for towing therebehind;

FIG. 8 is a fragmentary perspective view of one of the rake sections of the windrower illustrating the manner in which a blade may be mounted on and supported from the lower marginal portion of the rake section; and FIG. 9 is a fragmentary enlarged vertical sectional view taken substantially upon the plane indicated by the section line 9—9 of FIG. 8.

DETAILED DESCRIPTION OF THE INVENTION

Figure 3:
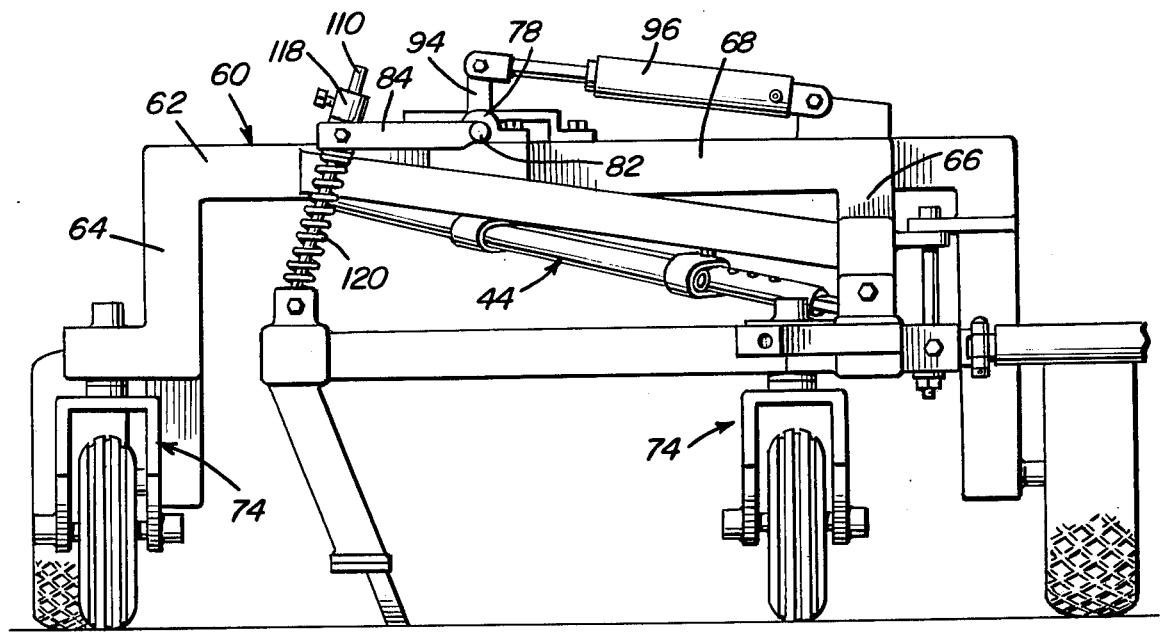
FIG. 3 is a front elevational view of the windrower in the transport position but with the rake sections lowered into contact with the ground and the tow bar therefor inclined outwardly to the left side of the windrower.

Referring now more specifically to the drawings, the numeral 10 generally designates the rock windrower of the instant invention. The windrower 10 includes an elongated longitudinal side frame member 12, a rear transverse axle assembly referred to in general by the reference numeral 14 supported from the frame 12, a tow bar assembly referred to in general by the reference numeral 16 and a plurality of longitudinally aligned and extending rake sections referred to in general by the reference numerals 18, 20, 22 and, 24 and 25.

The rear axle assembly 14 includes an inverted U-shaped frame 26 including a pair of depending legs 28 and 30 interconnected at their upper ends by means of a horizontal bight portion 32 extending therebetween. The lower end of the legs 28 and 30 include outwardly directed stub axle portions 34 and 36 from which support wheels 38 and 40 are journaled. The leg 30 of the frame 26 is pivotally supported from the frame member 12 as at 42 for horizontal swinging of the frame 26 about an upstanding axis. An adjustable length arm assembly 44 is pivotally connected as at 46 to the frame member 12 and as at 48 to the end of the bight portion 32 adjacent the leg 28. The arm assembly 44 includes a pair of opposite end arm members 50 and 52 overlappingly engaged with each other at adjacent ends and secured in adjusted relatively extended positions by means of a fastener 54 secured through one of a plurality of bores 56 formed through and spaced longitudinally of the arm member 50.

The front end portion of the frame 12 includes a front transverse axle assembly referred to in general by the reference numeral 60 and the axle assembly 60 also includes an inverted U-shaped frame 62 having a pair of depending legs 64 and 66 interconnected by means of an upper bight portion 68 extending therebetween. The lower end of the leg 66 includes a front to rear extending portion 70 pivotally attached as at 72 for oscillation relative to the main frame 12 about an axis extending longitudinally thereof and the lower end of the leg 64 supports one caster wheel assembly referred to in general by the reference numeral 74 at one side of the windrower 10 while the frame 12 supports a second caster wheel assembly 74 at the other side of the windrower 10.

A forward bearing block 76 is supported from the mid-portion of the bight portion 68 and a rear bearing block 78 is supported from a laterally projecting arm 80 supported rigidly from the frame 12. An operating shaft 82 has its opposite ends journaled through the bearing blocks 76 and 78 and the operating shaft includes a plurality of laterally outwardly projecting support arms 84, 86, 88, 90 and 92 supported therefrom at points spaced longitudinally therealong. In addition, the forward end of the shaft 82 includes a crank arm 94 projecting outwardly therefrom to which one end of a hydraulic cylinder 96 is pivotally attached, the other end of the hydraulic cylinder 96 being pivotally attached to the end of the bight portion 68 from which the leg 66 is supported as of 98.

A plurality of support arm structures 100, 102, 104, 106 and 108 are pivotally supported at one set of corresponding ends from the side frame member 12 at points spaced longitudinally therealong with the other set of corresponding ends of the support arms projecting generally horizontally outwardly from the right side of the frame member 12. The rake sections 18, 20, 22, 24 and 25 face transversely of the frame member 12 and are supported from the outer ends of the support arm structures 100, 102, 104, 106 and 108. Each of the rake structures or assemblies includes an upstanding shaft 110 having its lower end pivotally connected to the rake assembly for rotation about an axis extending longitudinally of the windrower 10 with the upper end of the shaft 110 slidably received through a bearing block 112 oscillatably supported between the furcations 114 of the free bifurcated end of the corresponding support arm structure 84, 86, 88, 90 and 92 by means of fasteners 116. In addition, each shaft 110 includes an abutment 118 thereon and adjustable therealong above the corresponding block 112 and a compression spring 120 is interposed between the lower end of each shaft 110 and the corresponding block 112. Accordingly, the rake sections 18, 20, 22, 24 and 25 may swing upwardly relative to the corresponding arm structure against the biasing action of the associated spring 120, but downward movement of each rake section is limited by contact of the corresponding abutment 118 with the associated block 112. In this manner, each of the rake sections is supported from the frame member 12 for "floating" movement and yet all of the rake sections may be simultaneously raised out of contact with the ground of contraction of the fluid motor 96.

Figure 4:
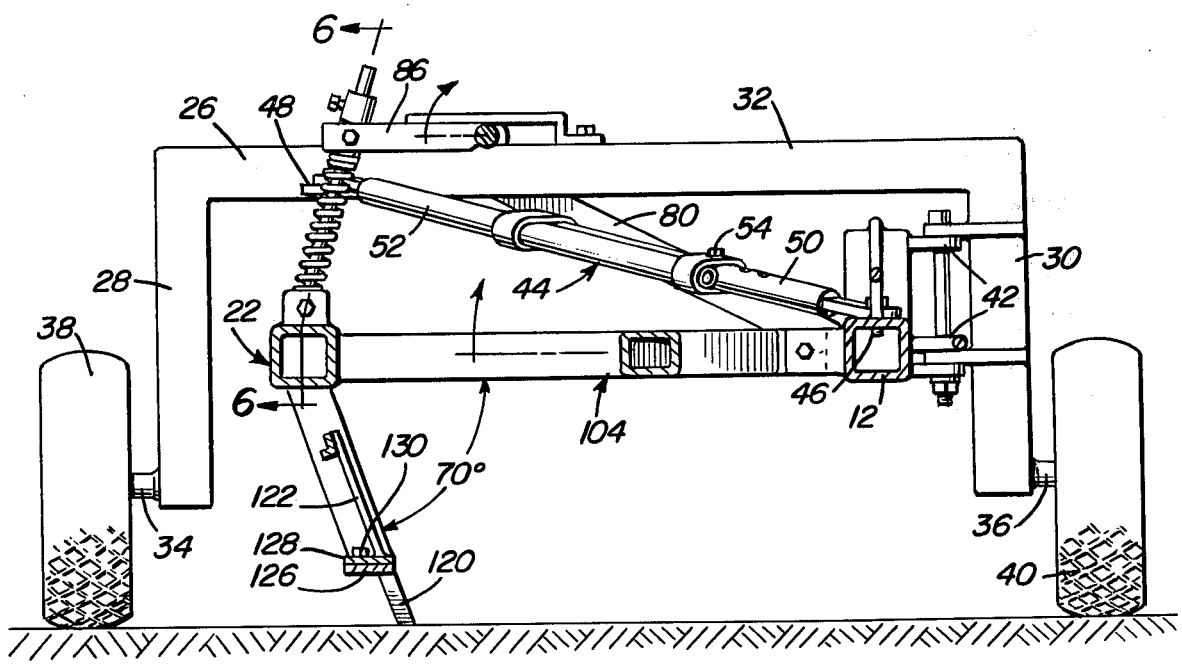
FIG. 4 is an enlarged fragmentary transverse vertical sectional view taken substantially upon the plane indicated by the section line 4—4 of FIG. 2.

From FIG. 4 of the drawings it may be seen that each of the rake sections is inclined substantially 70 degrees relative to the corresponding substantially horizontal support arm structure and from FIG. 2 of the drawings it may be seen that each rake section includes a plurality of longitudinally spaced tines 120 rearwardly and downwardly inclined at substantially 65°. Further, each of the rake section includes an edge upstanding horizontally disposed and longitudinally extending grate section 122 including longitudinally spaced vertical portions 123 between which longitudinally spaced grate bars 124 inclined forwardly and downwardly approximately 45° are mounted.

The tines 120 are dependingly supported from horizontal plates 126 removably anchored to lower horizontal plates 128 extending between the grate bars 124 of the corresponding rake section by means of fasteners 130 and from FIG. 9 of the drawings it may be seen that the tines 120 may be removed and that cutting blades 132 may be secured to vertical portion 123 of the grate sections 122 by means of threaded fasteners 134 in the event the rock windrower 10 is to be used for landscaping or grading operations.

With attention now invited more specifically to FIGS. 1, 5 and 7 of the drawings it may be seen that the frame member 12 includes a mount 133 centrally intermediate its opposite ends and that the mount 133 projects outwardly of the left side of the frame member 12. A transverse stub shaft portion 135 is journaled in the mount 133 and includes a flattened outer end portion 136 to which the flattened rear end portion 138 of a towing bar 140 is pivotally attached by means of a pivot fastener 142. The forward end of the towing bar 140 is flattened as at 144 and provided with an aperture 146 whereby the towing bar 140 may be operatively coupled to the hitch 148 of a tractor referred to in general by the reference numeral 150. Also, from FIG. 1 of the drawings it may be seen that an adjustable length brace referred to in general by the reference numeral 152 is provided including opposite end sections 154 and 156 telescopingly engaged with each other and secured in adjusted extended positions by means of a fastener 158 secured through a selected pair of diametrically opposite apertures 160 of a set of apertures 160 spaced longitudinally of the end section 156, the end section 154 including a single pair of diametrically opposite apertures (not shown) through which the fastener 158 is recieved. The remote ends of the end sections 154 and 156 are pivotally supported as at 164 and 166 to the tow bar 140 and the frame member 12 respectively. Also, the forward end of the tow bar 140 includes a retractable pivotally supported brace 168 which may be removably anchored to a bracket 170 carried by the forward end of the frame member 12.

In operation, the tow bar 140 is attached to the hitch 148 in the manner illustrated in FIG. 7 of the drawings and the effective length of the brace 152 is adjusted in accordance with the selected adjusted length of the arm assembly 44. It will be noted from FIG. 7 of the drawings that the rack sections 18, 20, 22, 24 and 25 are longitudinally aligned, but that they extend in a plane which is inclined relative to the direction of movement of the windrower 10. Accordingly, the rake sections are operative to engage rocks on the ground along which the windrower 10 is moved and to windrow the rocks behind the windrower 10.

If it is desired for the rake sections and the main frame member 12 to be further inclined relative to the direction of movement of the windrower 10, the arm assembly 44 may be foreshortened and the brace 152 may be lengthened. In addition, the hydraulic motor or cylinder 96 may be powered from the hydraulic system of the tractor 150 and the rake sections 18, 20, 22, 24 and 25 may be simultaneously raised if desired. Further, the hydraulic cylinder 96 may be extended in order to cause the support arms 84, 86, 88, 90 and 92 to bear downwardly on the rake sections through the medium of the compression springs 120.

If a rock windrowing operation has been completed and it is desired to transport the windrower 10 from one location to another, the hydraulic cylinder 96 is actuated so as to be foreshortened whereby the rake sections will be raised free of the ground. In addition, the arm assembly 44 is extended to its maximum length and the pivot fastener 164 is removed whereby the brace 152 may have its outer end disengaged from the tow bar 140 and swung rearwardly to a position supported alongside the frame 12 from the support bracket 190. Then, the forward end of the two bar 140 may be swung inwardly toward the front end of the frame member 12 to the phantom line position thereof illustrated in FIG. 1 and the brace 168 may be swung from its inoperative position and secured to the bracket 170 by means of a suitable fastener (not shown). In this manner, the windrower 10 may be trailed directly behind the tractor 150 with the frame member 12 paralleling the direction of movement of the windrower 10 so as to enable the windrower 10 to easily pass through narrow fence openings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A windrower including an elongated main frame having front and rear ends, a rear transverse axle assembly, first support means supporting said axle assembly from said frame for adjustable angular displacement in a horizontal plane relative to said frame, front towing means supported from said frame for adjustable shifting transversely thereof operative in conjunction with adjustment of said axle assembly to establish an angularly adjustable towed relationship of said frame relative to the path of movement of said windrower as the latter is towed behind a towing vehicle to which towing means is attached, said frame including longitudinally extending transversely facing rake means.

2. The combination of claim 1 including support means supporting said rake means for vertical adjustment relative to said frame.

3. The combination of claim 2 wherein said rake means includes individual rake sections extending and spaced longitudinally of said frame and facing transversely thereof, said support means including means supporting each of said rake sections from said frame for independent floating-type vertical shifting relative to said frame predetermined lower and upper positions thereof.

4. The combination of claim 3 wherein said support means includes means operative to simultaneously and equally vertically adjust the predetermined lower positions of said rake sections relative to said frame.

5. The combination of claim 4 wherein said support means includes means yielding biasing said rake sections toward said predetermined lower positions thereof.

6. The combination of claim 1 wherein said main frame includes an elongated longitudinal first side frame member, said rake means including a plurality of longitudinally spaced longitudinally extending and transversely facing rake sections, a plurality of transverse support arm means supported at one set of corresponding ends from said side frame member for oscillation about axes extending longitudinally of said main frame and with the other set of corresponding ends of said suport arm means projecting outwardly of one side of said side frame member, said rake sections being supported from said other set of corresponding ends of said support arm means.

7. The combination of claim 1 wherein said towing means includes an elongated towing bar extending lengthwise of said frame with the rear end of said towing bar pivotally supported from said frame for angular displacement of said bar in a horizontal plane relative to said frame, the forward end of said bar including means for attachment to a towing vehicle.

8. The combination of claim 7 including means inoperative to retain said towing bar in predetermined angularly adjusted positions relative to said frame, and means operative to retain said rear transverse axle means in predetermined angularly adjusted positions.

9. The combination of claim 8 wherein each of said predetermined positions of said towing bar correspond to a predetermined position of said axle means.

* * * * *